May 12, 1959  B. L. MILLS  2,886,196
CARRIER DUMPING DEVICE

Filed April 16, 1958  4 Sheets-Sheet 1

INVENTOR:
BURTON L. MILLS
BY J. C. Wiessler
ATTY.

May 12, 1959  B. L. MILLS  2,886,196
CARRIER DUMPING DEVICE

Filed April 16, 1958  4 Sheets-Sheet 2

INVENTOR.
BURTON L. MILLS
BY *J. C. Wiessler*

ATTY.

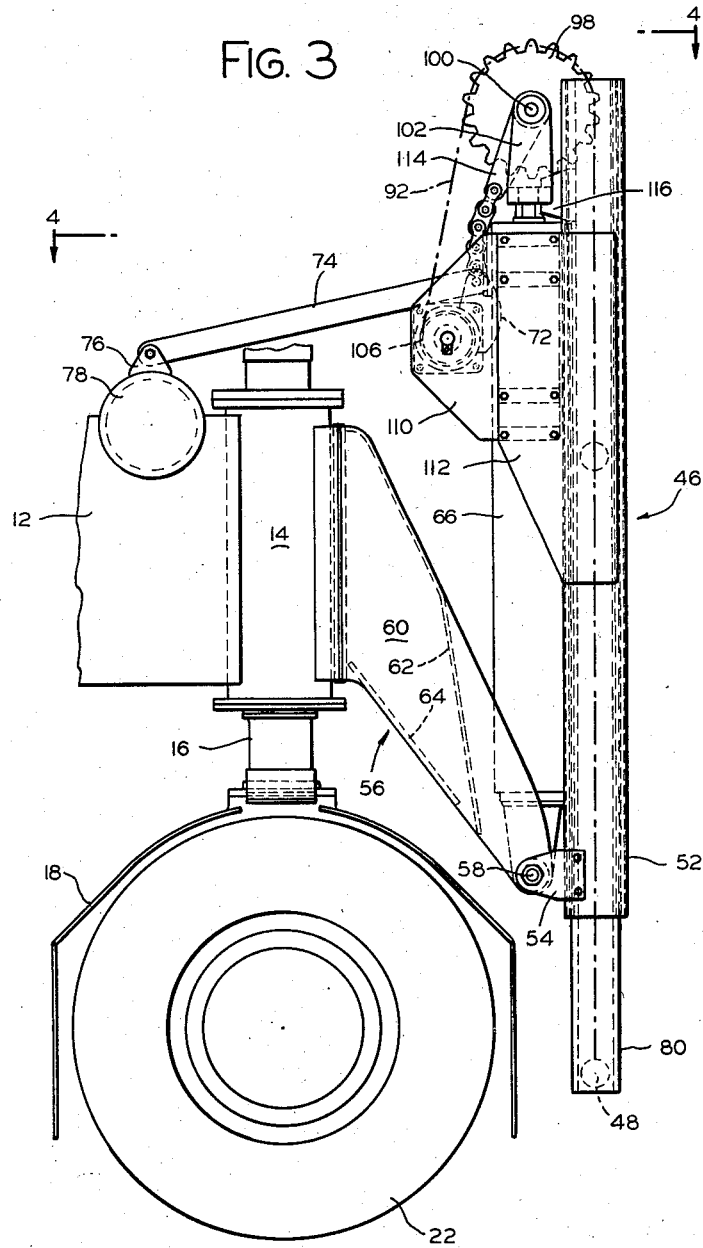

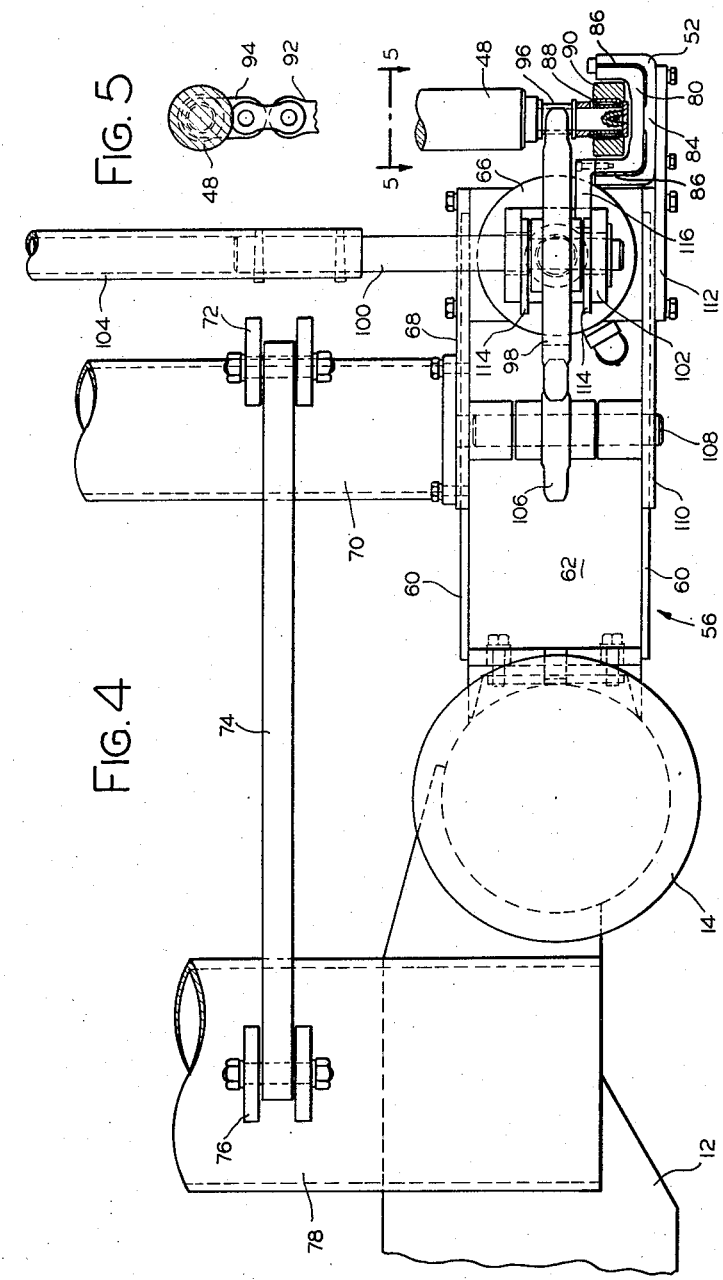

United States Patent Office 2,886,196
Patented May 12, 1959

2,886,196

CARRIER DUMPING DEVICE

Burton L. Mills, Buchanan, Mich., assignor to Clark Equipment Company, a corporation of Michigan Application April 16, 1958, Serial No. 728,828

10 Claims. (Cl. 214—318)

This invention relates to improvement in carrying, elevating and dumping devices for handling materials, and particularly to a new combination of load handling container and cooperating means for engaging and manipulating said container by means of an attachment on a load handling vehicle such as a straddle carrier or the like.

Straddle carriers having power operated means for engaging, transporting and selectively upending a load handling container for depositing materials in various locations are known in the art. An example of such a structure and combination is shown in the copending application of Franz H. Van Hellen, Serial No. 471,188, filed November 26, 1954, now Patent No. 2,860,798, (common assignee). The present invention constitutes an improvement upon the structure disclosed in the copending application of Van Hellen.

Briefly stated, the above mentioned copending application discloses an upending mechanism for a straddle carrier vehicle which incorporates a pair of power operated arms, one at each side of the vehicle, pivotally connected at one end to the straddle carrier and carrying at the other end a load upending means. While the structure as disclosed in said copending application is satisfactory for operation in most locations, the elongated pivotally connected power operated arms together with the operating means make a relatively bulky arrangement for installation as an attachment to a conventional straddle carrier, and the arms must project outwardly for some distance ahead of the carrier in order to provide the necessary operating clearance for the mechanism. In some operations and locations, it is desirable to have an attachment with a minimum amount of projection outwardly from the vehicle in order that it may perform the operations in close quarters with maximum maneuverability.

A structure of the above type also requires connection to the straddle carrier at a number of spaced locations which requires substantial modification of the basic straddle carrier structure and the exercise of care in assuring that the various elements are properly located with respect to each other in order to operate satisfactorily in the intended manner.

With the foregoing in mind, it is a primary object of the present invention to provide an improved structure and mechanism for a load handling vehicle which is capable of upending a load lying on the ground rearwardly of the vehicle.

It is a further object of the present invention to provide an improved mechanism for attachment to a load handling vehicle which may be readily attached to the vehicle without requiring substantial modification, thereby resulting in a saving of material, time and labor.

It is a still further object of the present invention to provide an improved load upending attachment for a straddle carrier or the like which is sturdy in construction and wherein the operating components have a minimum projection outwardly from the vehicle whereby the vehicle may be maneuvered in close quarters.

It is a still further object of the present invention to provide an improved structure and arrangement of elements and cooperation of a load handling container and a straddle carrier for selectively upending a load after it has been transported to an unloading station and deposited on the ground by the straddle carrier.

To accomplish the above stated objects, the present invention contemplates the incorporation of a novel upending mechanism with a straddle carrier, which mechanism comprises a rigidly substantially vertically upstanding frame adapted to be mounted at the rear end of the straddle carrier and having power operated means cooperating with said frame and carrying thereon the load upending means. Considering, specifically, a load such as a box of material, the straddle carrier is employed for engaging the box of material on the ground or other supporting surface, transporting the box from one location to another, and depositing the box on the ground or other supporting surface, in a conventional manner well-known in the art. After the box of material has been deposited in the new location, the straddle carrier is maneuvered from over the box and the upending mechanism is employed for raising one end of the box so as to upend the latter for dumping the material from the box.

Other objects and advantages of the present invention will become readily apparent from the following detailed description of a preferred embodiment thereof illustrated in the accompanying drawings wherein:

Figure 3 is an enlarged fragmentary side elevational view showing the improved upending attachment and its relative arrangement and mounting with respect to the straddle carrier;

Figure 4 is an enlarged plan view of the structure illustrated in Figure 3 as viewed along the line 4—4 thereof; and Figure 5 is a fragmentary cross-sectional view taken along the line 5—5 of Figure 4 showing a means for connecting the chain to the upending bar.

Figure 1:
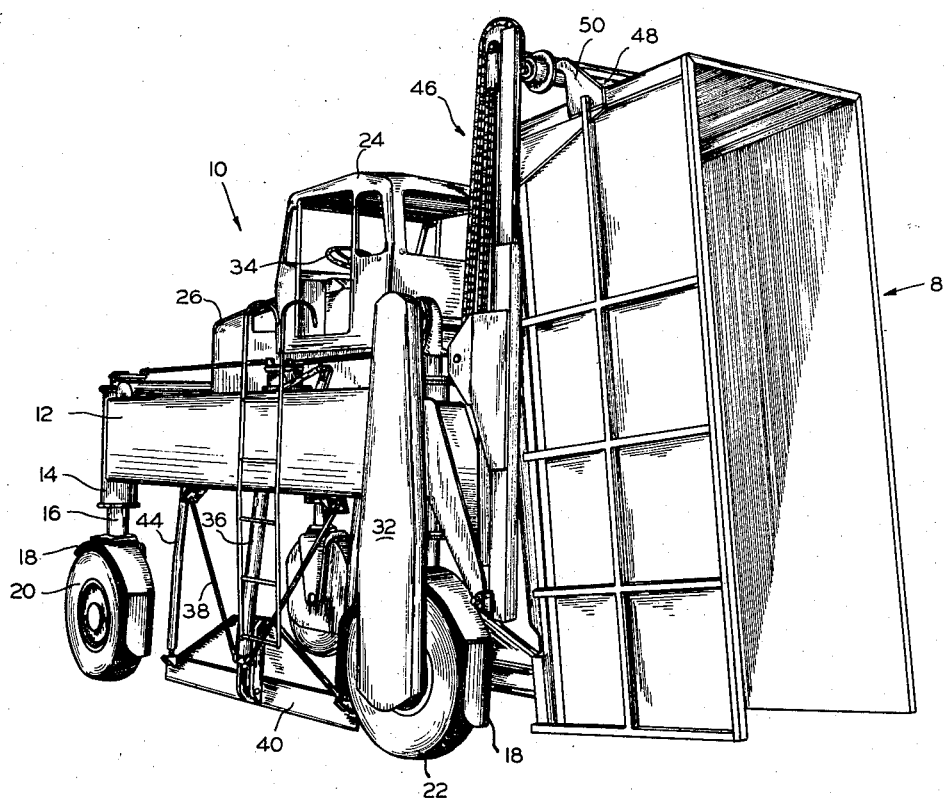
Figure 1 is a rear perspective view of a straddle carrier which illustrates the dumping device of the present invention in cooperation with a container for materials and showing the relationship of the parts when the container is elevated to a dump position.

The present invention is particularly concerned with an attachment for handling a load, such as the open-topped tote box shown generally at numeral 8 in Figure 1. This may be accomplished with a load handling vehicle of the type known as a straddle carrier or gantry truck as they are sometimes called. Such a straddle carrier is illustrated and generally indicated by the numeral 10 in Figure 1.

The carrier 10 includes a pair of side frame portions 12 which are interconnected by an overhead top portion in a well-known manner to form the gantry structure. Attached to the front and rear of each of the side frame portions 12 are vertical fork tube housings 14 so that there is one at each corner of the vehicle. Fork tubes 16 are journaled in the housings 14 and at their lower ends are secured to forks 18. Attached to the front forks 18 by means of stub shafts (not shown) are a pair of dirigible wheels 20, a pair of dirigible drive wheels 22 are similarly secured to the rear forks 18. The four sets of fork tubes 16, forks 18, and tire and wheel assemblies 20 and 22 are rotatable about the vertical axes of the housings 14 for steering the straddle carrier 10. The main frame 12 supports an operator's cab 24 and the carrier is propelled by an internal combustion engine or other suitable prime mover enclosed within a hood 26. The prime mover is adapted to drive the rear drive wheels 22 through suitable power transmission means including a differential unit 28 and a pair of drive shafts 30 (see Figure 2). The drive shafts 30 are connected with the wheel assemblies 22 by means of sprockets and chains enclosed by a pair of chain guards 32. The front and rear dirigible wheels 20 and 22 are connected to and operated by a suitable operator's steering wheel 34 located within the operator's cab 24 at the top of the vehicle.

The above described vehicle is provided at its underside with load engaging and elevating means, commonly called load hooks, which are operable to hold a load as the vehicle is driven from one location to another. Extending downwardly from the main frame 12, at each side, is a pipe or post 36 which is swingable about an axis extending lengthwise of the vehicle. The posts 36 are restrained from swinging movement lengthwise of the vehicle by means of diagonal braces 38. Each post 36 carries an engaging plate or load hook 40, formed with a laterally inwardly directed ledge or foot 42, which is movable upwardly and downwardly on the post 36 by hydraulic pistons and cylinder assembly means (not shown) acting through links 44. The power for operating the hooks 40 ordinarily is derived from the same prime mover which propels the vehicle 10. The selective movement of the hooks 40 toward and away from each other, and up and down, permits loads to be engaged and discharged at the will of the operator of the vehicle.

The upending mechanism of the present invention shall now be described which, when incorporated with a load handling vehicle such as the straddle carrier 10, is operable to tilt or dump a tote box, such as is shown at numeral 8 in Figure 1, to empty the contents thereof.

In its broadest aspects, the upending mechanism of the present invention comprises an hydraulically actuated telescopic upright frame, generally indicated at 46 in Figure 1, which is substantially rigidly secured to and carried upon the rear end of the straddle carrier 10. The telescopic upright frame is adapted to guide a cross bar 48 which is engageable with hook members 50 secured to one end of the tote box 8 to lift same for dumping as shown in Figure 1.

Figure 2:
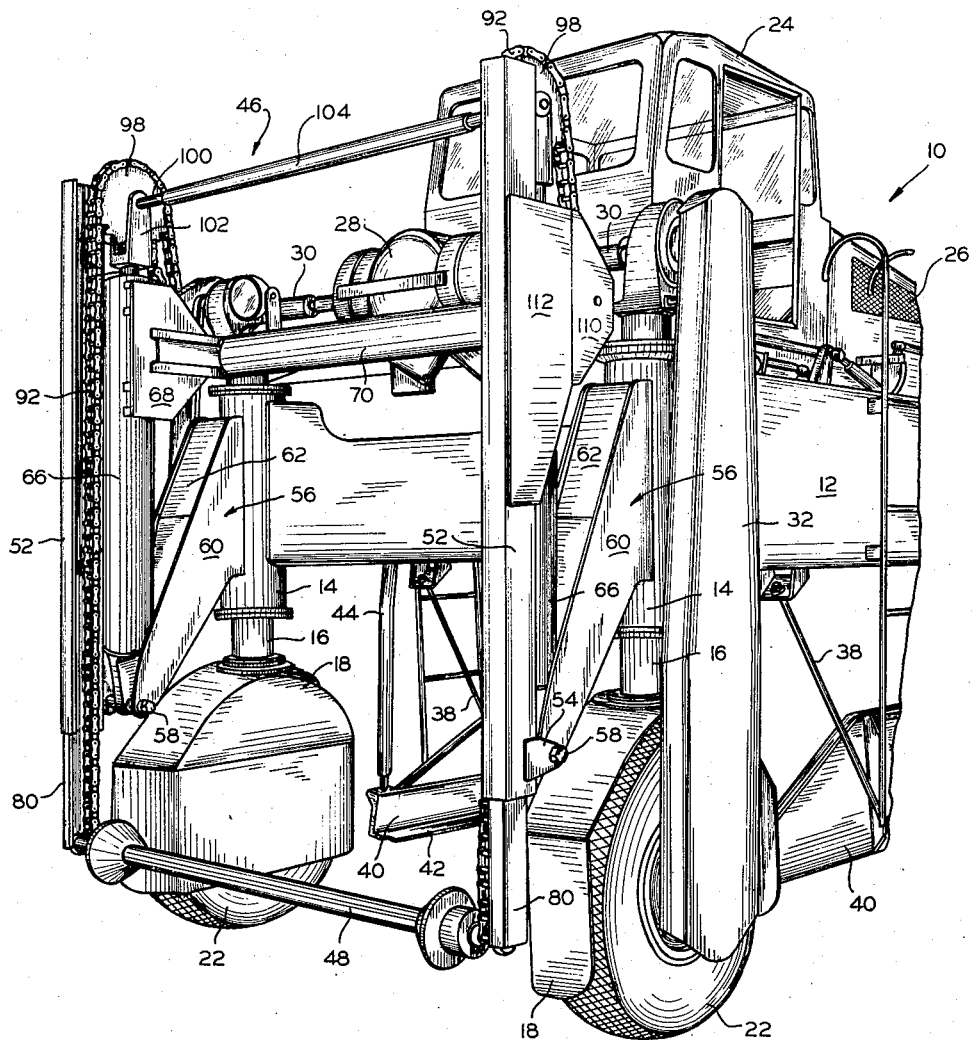
Figure 2 is an enlarged fragmentary rear perspective view illustrating the improved upending mechanism and its connection with a straddle carrier and showing the upending mechanism in the lowered position.

Referring to Figures 2 to 4, it may be seen that the upright frame 46 comprises a pair of parallel vertical channel beams 52. Adjacent the lower ends thereof, the channel beams 52 are secured to the straddle carrier 10 by means of mounting plates 54 which are pivotally attached to mounting members 56 by means of transversely extending bolts 58. The mounting members 56 are rigidly secured, conveniently by welding, to the rear vertical fork tube housings 14 and comprise a rigid unitary box-like structure formed of a pair of spaced vertically extending side plates 60 which are in turn secured together by means of transverse plates 62 and 64 so formed as to provide a bifurcated portion at the lower ends thereof having apertures through which the bolts 58 may pass.

Pivotally mounted upon the bolts 58 within the bifurcated portion of the mounting members 56 are substantially vertically extending hydraulic piston and cylinder assemblies 66. Additional rigidity of the structure thus far described is attained by means of a pair of plates 68 secured to the inboard sides of each cylinder assembly 66 and tied together transversely by means of a transverse brace member 70. The transverse brace member 70 is adapted for limited pivotal movement in a direction extending longitudinally of the straddle carrier 10. To this end a bifurcated mounting member 72 is secured to the member 70 adjacent each end thereof and is pivotally attached to a link 74 extending inwardly toward the main frame of the straddle carrier 10. At their opposite ends the links 74 are pivotally secured to bifurcated mounting members 76 which are in turn attached adjacent the opposite ends of a transverse brace member 78 secured to the main frame 12 of the vehicle.

Mounted for telescopic vertical sliding movement relative to and within each of the channel beams 52 is a channel beam 80. The beams 52 are provided with spaced projections or pads 84 and 86 (Figure 4), which cooperate during the vertical sliding movement of the beams relative to one another to reduce the amount of surface contact area of the beams and thereby to reduce the sliding friction therebetween.

The upending cross-bar 48 is provided at each end thereof with suitable bearings 88 upon which are mounted rollers 90 adapted to fit within the channel beams 80 to thereby adapt the cross-bar 48 for vertical movement relative thereto.

To perform the upending function, the load upending crossbar 48 is moved upwardly and downwardly within the channel beams 80. Such movement is effected by power actuated means including a pair of chains 92. Each chain 92 is pivotally secured at its one end to the crossbar 48 by means of an attaching link 94 (Figure 5) suitably retained upon a shoulder portion 96 of the cross-bar 48. In addition, each chain 92 is trained over a sprocket 98 which is mounted for rotation on shaft 100. The shafts 100 are carried by yoke members 102 at the ends of the piston rods of the hydraulic piston and cylinder assemblies 66. A transverse shaft 104 synchronizes the rotation of sprockets 98 during vertical movement thereof, thereby maintaining cross-bar 48 level and free of binding in channel members 52. Each chain 92 is further trained over an additional sprocket 106 which is mounted for rotation on a shaft 108. Each shaft 108 is mounted between the adjacent plate 68 and an additional supporting plate 110 which constitutes an extension of a plate 112. Each plate 112 is rigidly secured to the upper-central base portion of a channel member 52. The plates 110 are additionally secured to the wall of the adjacent cylinder assembly 66 (see Figure 4). After passing over the sprockets 98 and 106, the opposite end of each chain is pivotally attached to the one end of shaft 100 by means of special connecting links 114 spaced on opposite sides of the sprocket 98.

The chains 92 and sprockets 98 and 106 thus serve as motion transmitting means between the hydraulic cylinder assemblies 66 and the cross-bar 48.

At this point it should be noted that the inner channel beams 80 are also connected for movement by the cylinder assemblies 66. Such connection between the channel beams 80 is effected by means of offset plates 116 connected at one end to the inner flanges of the channel beams 80, by any suitable means, and at the other end thereof to the yoke members 102. By means of the direct connection just described, the inner channel beams 80 are movable relative to the stationary outer channel beams 52 in an amount equal to the distance traveled by the piston rods of the hydraulic cylinder assemblies 66.

By virtue of the manner of connection of each chain 92 between cross-bar 48 and the vertically movable shaft 100, the cross-bar 48 moves vertically, upon energization of cylinder assemblies 66, at a 3:1 ratio relative to the vertical movement of inner channel members 80, as will be readily seen by persons skilled in the art.

The above described compound elevating arrangement makes it possible to provide a structure having a minimum height relative to the straddle carrier 10 for maximum visibility and maneuverability, yet providing a sufficient vertical elevation for the cross-bar 48 to perform the upending operation.

The hydraulic cylinder assemblies 66 are operated by a conventional fluid pressure control system for effecting the upending operation.

Having now described in detail the structure of the elements making up the present invention together with the relative cooperation therebetween, it is believed that the invention may be clarified and summarized by describing a typical operation wherein a straddle carrier equipped with the invention picks up a loaded tote box, transports the box to a dumping location, deposits the box and then dumps the contents thereof, all without the assistance of a helper on the ground. The operator in the straddle carrier performs all operations from within the cab merely by selecting and manipulating in the proper sequence a plurality of control elements.

Let it be assumed for purposes of the following description that the load hooks are elevated, the upending mechanism is in the position shown in Figures 2 and 3, and that the straddle carrier 10 is being maneuvered into position to pick up a loaded tote box 8.

The straddle carrier 10 is first maneuvered into a position such that the load hooks 40 are suitably positioned so as to engage the tote box 8. The operator then manipulates the conventional control means to cause the load hooks 40 to be moved vertically downward and laterally inward to engage the tote box 8.

The conventional control means is then manipulated to cause the load hooks 40, and thus the tote box 8, to be elevated into transporting position. The straddle carrier 10 may then be driven to the unloading and dumping destination. When the unloading and dumping destination has been reached, the operator then manipulates the conventional control elements to cause the load hooks 40 to be lowered vertically and moved outward laterally to deposit the loaded tote box 8 on the ground or other supporting surface.

The straddle carrier 10 may then be driven away from the tote box 8. It should be noted that the straddle carrier 10 may be driven either forwardly or rearwardly away from the tote box, as desired. If, however, the cross-bar 48 is in the lowered position, it must first be raised to a height to clear the tote box in order to permit the straddle carrier to be driven forwardly after depositing the tote box on the ground or other supporting surface.

With the cross-bar 48 lowered, the straddle carrier 10 is then maneuvered into a position such that cross-bar 48 is in juxtaposition to the hook members 50 at the one end of the tote box 8.

The operator then manipulates a suitable control element to cause the admission of fluid under pressure to the lower ends of the hydraulic cylinder assemblies 66 whereupon the piston rods will be moved upwardly. This action will cause the inner channel beams 80 to be moved upwardly relative to the outer channel beams 52, and simultaneously cause the sprockets 98 to be moved upwardly as previously described.

Through the compound elevating movement above described, the chains 92 will impart an upward movement to the cross-bar 48 which is magnified relative to the distance traveled by the piston rods and the inner channel beams 80 such that the tote box 8 will be upended as shown in Figure 1, thus completing the dumping operation.

At this point, the material within the tote box 8 will fall from the box under the force of gravity. If the material tends to adhere to the inside of the box, the latter may be jogged or jostled, by suitable actuation of the hydraulic piston and cylinder assemblies 66, while the straddle carrier 10 is slowly moved away from the material being dumped. After the tote box 8 has been emptied, it is returned to its normal horizontal position by lowering the cross-bar 48 while slowly moving the straddle carrier away from the material being dumped. At this point, it should be noted that the hydraulic cylinder assemblies 66 are of the double-acting type and in order to lower the cross-bar 48, fluid is bled from the lower ends of the cylinders while fluid under pressure is simultaneously directed to the upper ends of the cylinders. This causes the piston rods to be retracted resulting in a reversal of the direction of movement of the inner channel beams 80 and the chains 92.

From the foregoing description of the structure and operation of the present invention it should now be apparent that there is provided an improved structure and mechanism for a load handling vehicle of the straddle carrier type which accomplishes the objects and advantages set out.

From the description it may be seen that the unitary attachment may be readily secured to a vehicle such as a straddle carrier or the like in a compact manner with a minimum amount of outward projection from the vehicle, and with a minimum amount of modification to the vehicle, thereby resulting in a saving of time, labor, and materials, and providing an arrangement which can be readily maneuvered in close quarters to accomplish a dumping operation.

While only one illustrative embodiment of the invention has been shown and described herein, it will be apparent to those skilled in the art of making mechanisms of the character described that alterations and different embodiments and applications of the invention will suggest themselves without departing from the spirit and scope thereof. Therefore, the particular disclosure herein is intended to be illustrative only, and the invention is not intended to be limited thereto, nor otherwise than by the terms of the appended claims.

What is claimed as new and desired to be secured by Letters Patent of the United States is:

1. In an industrial material handling vehicle of the type equipped to straddle, elevate, transport, and deposit box-like containers, the combination comprising, a horizontal load upending element disposed across one end of the vehicle, parallel substantially vertically extending guide members supported on the vehicle and carrying said element therebetween, selectively operable power actuated means operatively connected with said element for raising and lowering same relative to said vertically extending guide members, and engagement means on the container adapted to be coupled with said element whereby the container may be upended and its contents discharged by said movement of said element relative to said vertically extending guide members.

2. The combination as specified in claim 1, including second guide members slidably supported within said first mentioned guide members for telescopic sliding movement relative thereto, said selectively operable power means having connection with said second guide members for raising and lowering same relative to said first mentioned guide members.

3. The combination as specified in claim 2, wherein said load upending element is carried between said second guide members.

4. In an industrial material handling vehicle of the type equipped to straddle, elevate, transport, and deposit box-like containers, the combination comprising, a horizontal load upending element disposed across one end of the vehicle, first parallel substantially vertically extending guide members supported on the vehicle, second guide members disposed on said first guide members for sliding movement relative thereto and carrying said element therebetween, selectively operable power actuated means having connection with said second guide members and also having connection with said element, whereby both said second guide members and said element may be raised and lowered relative to said first guide members, and engagement means on the container adapted to be coupled with said element whereby the container may be upended and its contents discharged by the vertical movement of said element.

5. The combination specified in claim 4, including means coupled between said power actuated means and said element to impart a greater degree of movement to said element than is imparted to said second guide members.

6. In an industrial material handling vehicle of the class adapted to straddle, elevate, transport, and deposit box-like containers, the combination comprising, a horizontal upending element disposed across one end of said vehicle, first parallel substantially vertically extending guide members supported on the vehicle, second guide members disposed on said first guide members for vertical sliding movement relative thereto and carrying said element therebetween, hydraulic piston and cylinder means carried by the vehicle, motion transmitting means including sprocket and chain means interconnecting said bar and said hydraulic piston and cylinder means, and means interconnecting said second guide members and said hydraulic piston and cylinder means, means for selectively operating said hydraulic piston and cylinder means to elevate and lower said second guide means and said element, and load engagement means provided on one end of the container for selective engagement by said element, the elevation of said element when engaged with the said load engagement means serving to upend the container and unload the same.

7. The combination specified in claim 6, wherein upon operation of said hydraulic piston and cylinder means said sprocket and chain means is adapted and arranged to impart movement of said element at a 3:1 ratio relative to said second guide members.

8. In an industrial material handling vehicle of the class adapted to straddle, elevate, transport, and deposit box-like containers, the combination comprising, a horizontal upending element disposed across one end of said vehicle, parallel substantially vertically extending guide members supported on the vehicle and carrying said element therebetween, hydraulic cylinder means having a piston and piston rod carried by the vehicle adjacent each of said guide members, said piston rod extending substantially parallel with said guide members, a first sprocket supported by each of said guide members, a second sprocket movably carried by each of said piston rods, a chain having one end thereof secured to each end of said element and being trained over said sprockets and having its other end connected for movement by said piston rod, said first and second sprockets being adapted and arranged such that upon movement of said piston rod through a predetermined distance said element will move through a greater distance.

9. The combination specified in claim 8, including second guide members slidably supported within said first mentioned guide members, and wherein said element is carried between said second guide members.

10. The combination specified in claim 9, including means interconnecting said second guide members for movement with said piston rods, whereby upon movement of said piston rods through a predetermined distance, said second guide members will be moved through an equal distance.

No references cited.